United States Patent [19]
Pauls

[11] 3,790,129
[45] Feb. 5, 1974

[54] VALVE DETENT MECHANISM
[75] Inventor: Charles W. Pauls, Norman, Okla.
[73] Assignee: The Cessna Aircraft Company, Wichita, Kans.
[22] Filed: July 15, 1971
[21] Appl. No.: 162,876

[52] U.S. Cl. .................. 251/297, 74/527, 91/358 A
[51] Int. Cl. ............................................ F16k 31/04
[58] Field of Search ... 251/68, 297; 74/527; 91/392, 91/358 A

[56] References Cited
UNITED STATES PATENTS

| | | | |
|---|---|---|---|
| 3,420,393 | 1/1969 | Omon | 91/358 A |
| 3,153,949 | 10/1964 | Rice | 74/527 |
| 2,632,821 | 3/1953 | Wright et al. | 74/527 X |
| 2,826,286 | 3/1958 | Boyce | 74/527 X |
| 3,089,507 | 5/1963 | Drake et al. | 251/68 X |

*Primary Examiner*—Henry T. Klinksiek
*Attorney, Agent, or Firm*—Edward L. Brown, Jr.

[57] ABSTRACT

A solenoid-operated detent mechanism for a spool valve having a spring centered neutral position and a detented operating position. The mechanism includes a locking device in the form of a movable solenoid armature having a cam surface locking the detent balls in engagement with grooves in the spool in the detented position and releasable when energized to permit the spool centering spring to return the spool to neutral. One embodiment contemplates a longitudinally moving armature spring biased in one direction to urge detent balls radially into a spool detent groove and pulled oppositely by the solenoid upon actuation to release the balls. Another embodiment has a rotating armature that through a cam surface lifts radially spring-pressed detent pawls from the spool groove.

6 Claims, 4 Drawing Figures

PATENTED FEB 5 1974 3,790,129

INVENTOR
CHARLES W. PAULS
Gregory J. Nelson
ATTORNEY

VALVE DETENT MECHANISM

BACKGROUND OF THE INVENTION

This invention relates to hydraulic spool control valves with detent positions and relates more particularly to means automatically releasing the detent mechanism.

Spool type valves include generally a valve body having a longitudinal bore in which the control spool is reciprocable to control fluid flow through fluid passages in the body. A conventional application of such valve contem-plates flow control between a fluid pump and a pressure operated mechanism such as a hydraulic cylinder. It is also well known to provide such a valve with a spring centering mechanism engaging the spool and urging same to a neutral position blocking flow to the motor and a detent mechanism which holds or locks the spool in a second motor-actuating position against the bias of the centering spring.

SUMMARY OF THE INVENTION

The present invention contemplates improved automatic detent release means which upon actuation unlocks the detent to permit the centering spring to return the spool automatically to the first neutral position.

The invention includes radially moving detent members which move into a cooperating groove in the spool upon shifting the spool to a second position remote from the first position to which the spool is spring biased. Another spring biases the detent means toward the spool groove into a locking position. Locking means engage the detent members through a cam surface and actuating means, when energized, displace the locking means so as to relieve the spring bias on the detent members. Thereupon, the spool centering spring forces the detent mechanism out of its locking position and returns the spool automatically to the first position. The preferred embodiments utilize an electric solenoid as actuating means whose circuit is closed and energized upon movement when the hydraulic motor associated with the valve moves to the end of its stroke or to a predetermined position. The locking means are formed as an integral part of the solenoid plunger which is drawn against the detent spring upon energization of the solenoid to permit the spool to return to neutral automatically and cease fluid flow to the motor. One embodiment incorporates a longitudinally moving plunger or armature while another uses a rotary-action armature.

Accordingly, the invention broadly contemplates a detent mechanism with automatic detent release means for unlocking the spool detent to permit the spool centering means to return the spool to a non-detent position.

A more specific object of the present invention is to provide a radially acting detent means holding the spool in a detented position against the bias of spring means normally urging the spool to a neutral position, and a release mechanism automatically unlocking said detent means.

A further object in accordance with the preceding contemplates an actuating solenoid whose armature forms the locking mechanism, the solenoid energized to a releasing position in response to a predetermined condition in the hydraulic system.

These and other specific objectives and advantages of the present invention will be found in the following detailed description of the preferred embodiments and accompanying drawings.

DETAILED DESCRIPTION OF THE PREFERRED EMBODIMENTS

Figure 1:
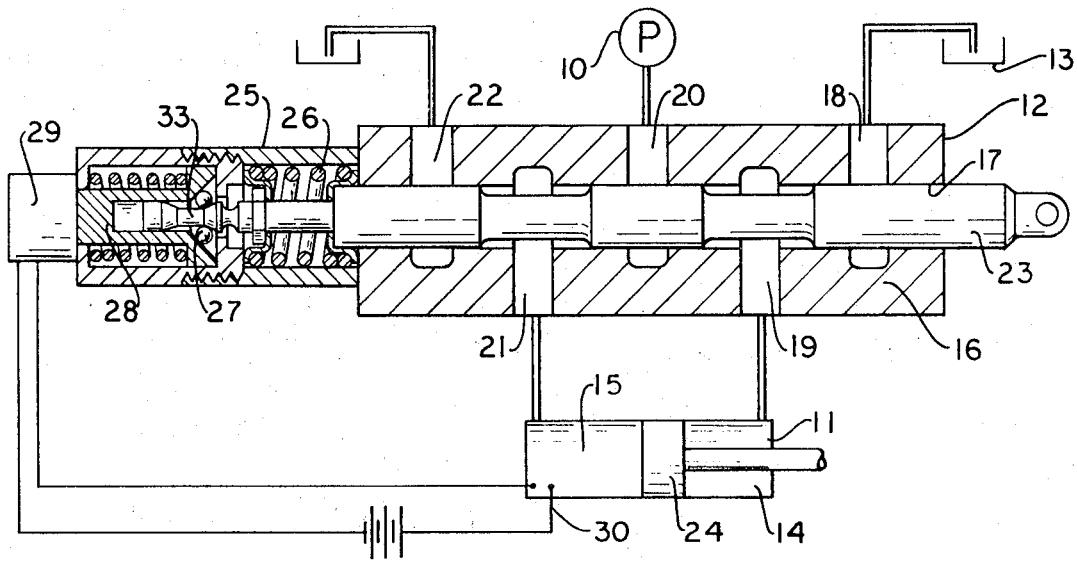
FIG. 1 is a schematic representation of a hydraulic system incorporating the present invention with the control valve and detent shown in longitudinal cross-section.

Referring specifically to the drawings in which like numerals refer to the same elements throughout the several views, FIG. 1 illustrates a hydraulic system comprising a fluid pump 10, fluid motor 11 shown as a linear cylinder and control valve 12 interposed between the pump and motor. Fluid conduits, illustrated schematically by double lines, interconnect the valve with the pump, reservoir and opposite ends 14, 15 of the motor.

Control valve 12 has a body 16 with a longitudinal bore 17 and intersected by axially spaced passages 18–22. Outer passages 18 and 22 provide return of low pressure fluid to the reservoir while passage 20 carries pressure fluid to bore 17 from the pump. The work port passages 19 and 21 respectively connect with the opposite cylinder ends 14, 15. A manually shiftable spool 23 fits closely within bore 17 so as to isolate both motor ports 19, 21 from the adjacent inlet and outlet passages when the spool is in the neutral position shown. Upon leftward movement away from neutral, the reduced diameter spool groove at the right end of the spool permits connection of port 19 with inlet passage 20 and connection of the other port 21 with return passage 22. Motive fluid delivered to motor chamber 14 drives piston 24 leftwardly, and fluid displaced from cylinder end 15 returns through passages 21 and 22 to reservoir. Rightward spool movement from neutral similarly drives the piston the opposite direction by connecting motor chamber 15 with the prssure source and chamber 14 with the reservoir through passages 18 and 19. It will be understood that the foregoing valve construction and arrangement of passages is typical and that the detent described herein is adaptable to numerous valve construction.

A hollow cap 25 secured to the valve body covers the left end of spool 23 and houses the spool centering spring 26, the detent 27 and detent release 28, all of which are described in greater detail below with reference to FIG. 2. Centering spring 26 biases spool 23 to the neutral position in the absence of other forces on the spool, while the detent 27 acts upon leftward movement of the spool to hold the spool unattended in a position driving the motor piston 24 leftwardly.

A solenoid 29 mounted to cap 25 energizes the detent release 28 upon closing of sensing switch 30 by piston 24. In consequence, the release mechanism 28 unlocks detent 27 to permit the centering spring 26 to return the spool to neutral. The FIG. 1 system thus provides an automatic sequence control of motor 11: the spool is shifted manually to its detent position driving the piston leftwardly; the spool is held in this motor-actuating position by the detent until the piston 24 reaches a predetermined position along the stroke actuating the switch 30 completing the circuit and energizing solenoid 29; thereupon, detent mechanism is released and the spool returns to a neutral position, blocking flow to the motor and bringing the piston to rest at a predetermine position in this case.

Figure 2:
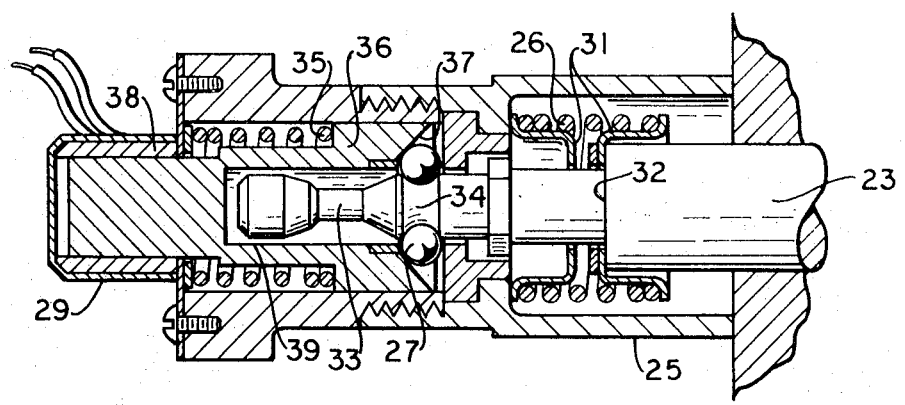
FIG. 2 is an enlarged cross-sectional view of the detent and release mechanism of FIG. 1.

Referring now to FIG. 2 which shows spool 23 in a detented position, the structure and operation of the invention are described in greater detail. In the detented position, spring 26 acts through the cup-shaped washers between spool shoulder 32 and an internal flanged portion of cap 25 to urge the spool rightwardly toward neutral. As seen in FIG. 1, when the spool is in its neutral position, the centering spring extends between the valve body 16 and end cup 25. The left end of the spool is provided with converging tapered land that define a reduced diameter section 33 in which a plurality of symmetrically disposed detent balls 27 rest when the spool is in neutral.

The detent balls 27 move radially outwardly and then drop inwardly into the spool groove 34 as the spool is shifted to the detent position. Detent spring 35 biases sleeve member 36 rightwardly so that its chamfered end 37 acts as a cam translating this linear spring force into a radial component holding the balls 27 in groove 34. This locks the spool in detented position as the bias of centering spring 31 is insufficient to push the balls out of groove 34.

Sleeve 36 is an integral portion of the longitudinally movable plunger or armature of solenoid 29. The solenoid winding 38 encircles the solid cylindrical portion of armature or plunger 36 which has a blind bore 39 which receives the spool end. Upon energizing the solenoid as above described, armature 36 becomes magnetized and the magnetic field in the solenoid acting on the induced poles on the plunger causes the plunger 36 to move within the solenoid leftwardly against the bias of detent spring 35. Cam surface 37 leaves contact with balls 27 to relieve the bias of spring 35 from balls 27. This allows centering spring 26 to pull spool 23 rightwardly to a neutral position by displacing balls 27 radially from groove 34.

It will be obvious that although I have shown the detent mechanism only in cooperation with one end of the valve, it is easily adaptable to either or both ends of the spool to permit various detent positions.

Figure 3:
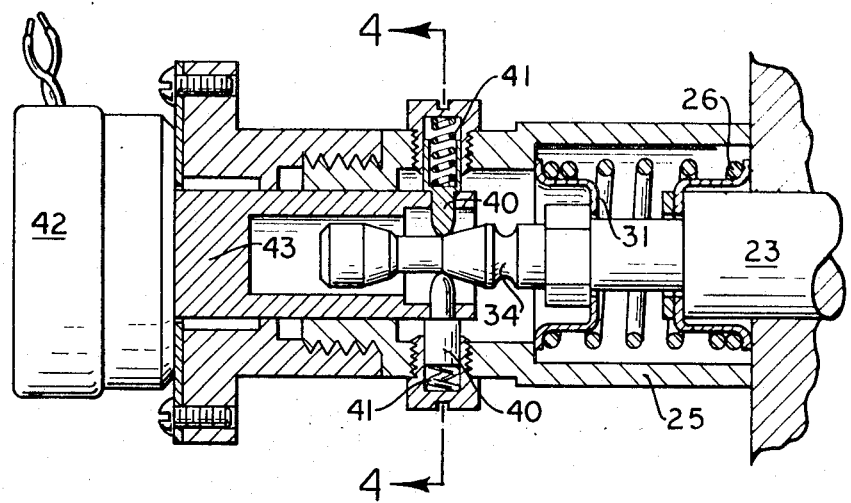
FIG. 3 is a cross-section similar to FIG. 2 showing another embodiment of the invention.
Figure 4:
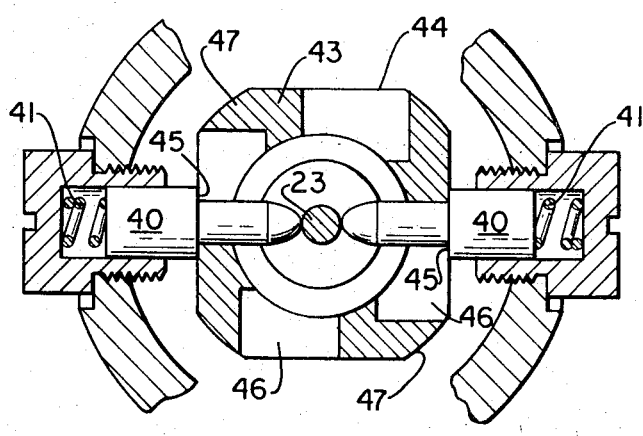
FIG. 4 is a transverse cross-section taken along line 4—4 of FIG. 3.

The embodiment shown in FIGS. 3 and 4 differs from that shown in FIG. 1 in that the release mechanism rotates and includes a plurality of symmetrically disposed pawls 40 in place of the ball detent. Each pawl is individually urged by a spring 41 inwardly against the spool 23. The spool is shown in its neutral position. The pawls have reduced diameter inner ends that drop into groove 34 upon positioning the spool to its detent position.

The actuating solenoid 42 in FIG. 3 is of the rotary type powering its armature 43 to rotate about the longitudinal spool axis. The armature has a blind bore accepting spool 23 and, as shown in FIG. 4, a multilobed camming surface 44 engaging the pawl shoulders 45. The pawl inner ends extend through slots 46 in the armature to contact the spool.

Upon energizing solenoid 42, armature 43 rotates counterclockwise as seen in FIG. 4 causing portions 47 of cam surface 44 to engage shoulders 45 to force pawls 40 outwardly compressing springs 41. The pawls are lifted out of groove 34, and centering spring 26 returns spool 23 to neutral. When the solenoid is de-energized, the springs 41, acting through shoulders 45 and cam surface 44, rotate armature 43 clockwise back to its FIGS. 4 position.

The detent release mechanism of this invention, although electrically actuated, may be manually released in case of power failure or other electrical malfunction. In such a case the operator may return the spool to neutral by exerting sufficient manual force to cause the detent balls to be urged outwardly against surface 37 due to the force applied and permit disengagement and return of the spool to a neutral position.

The foregoing detailed description of the invention is to be considered exemplary in nature and not as limiting the scope and spirit of the invention as set forth in the appended claims.

Having described my invention with sufficient clarity that those skilled in the art may use and practice same, I claim:

1. A valve mechanism controlling flow between a fluid source and a hydraulic motor, comprising:
    a valve body having a longitudinal bore, an inlet passage communicating with said source and an outlet passage communicating with the motor, said passages intersecting said bore at spaced locations;
    a spool in said bore manually shiftable between a first position blocking flow between said passages and a second position directing fluid from the inlet to the outlet passage through the bore, said spool having an outer reduced diameter section, an adjacent annular groove and a tapered land section therebetween;
    A first spring engaging the spool to urge same to the first position;
    a detent mechanism radially registering with said annular groove in said spool upon movement of the spool to the second position;
    second spring means urging the detent mechanism into said annular groove to hold the spool in said second position directing flow to the motor;
    a solenoid at one end of said spool having a movable armature with a blind bore accepting the outer end of said spool and a cam surface engaging said detent mechanism, said solenoid when energized actuating the armature to relieve the bias of said second spring means on the detent; and
    means sensing movement of the motor to a predetermined position and thereupon energizing the solenoid to relieve the bias of said second spring means and thereby permit said first spring means to return the spool to said first position blocking flow to the motor.

2. The device of claim 1 wherein said second spring means directly engages said detent means to urge same radially into said spool groove and said armature rotates upon energizing the solenoid to oppose the biasing force of said second spring means and shift said locking means to said release position.

3. The device of claim 1 wherein said detent means are a plurality of pistons having inner ends engaging the spool groove in said second position and wherein said armature has a sleeve surrounding the spool, an exterior cam surface engaging a portion of said pistons, said solenoid when energized rotating said sleeve to lift said pistons out of the spool groove and permit the first spring means to return the spool to said first position.

4. The device of claim 4 wherein said second spring means acts through said armature to bias the detent and wherein said armature shifts to relieve said second spring bias and permit said first spring means to urge said detent radially out of said groove and return the spool to said first position.

5. The device of claim 5 wherein said armature has an external cam surface engaging said detent and rotates upon actuation to lift said detent radially out of said groove, and wherein said second spring means extends radially between said valve body and detent to urge the latter inwardly toward said groove.

6. In a hydraulic spool control valve comprising a body having a longitudinal bore and fluid carrying passages intersecting the bores, a spool shiftable in said bore between first and second positions to control flow between said passages through said bore, and first spring means engaging and biasing said spool to the first position, wherein the improvement comprises:

said spool having an outer reduced diameter section and adjacent annular groove and a tapered land section therebetween;

radially movable ball detent means which register with said groove upon positioning the spool in said second position and which are accomodated in said reduced diametral section when said spool is in said first position;

a solenoid armature having a bore accepting the spool end and a generally concave cam surface;

second spring means biasing said armature into engagement with said detent balls and holding said balls in register with said groove when said spool is in said second position; and a solenoid cooperating with said armature, said solenoid when energized causing said armature to longitudinally shift against the bias of the second spring thereby permitting said detent to radially eject from said groove permitting said first spring to return said spool to said first position.

\* \* \* \* \*